Jan. 24, 1950 J. F. PROCH 2,495,344
FILM WINDING APPARATUS
Filed July 6, 1948 3 Sheets-Sheet 1
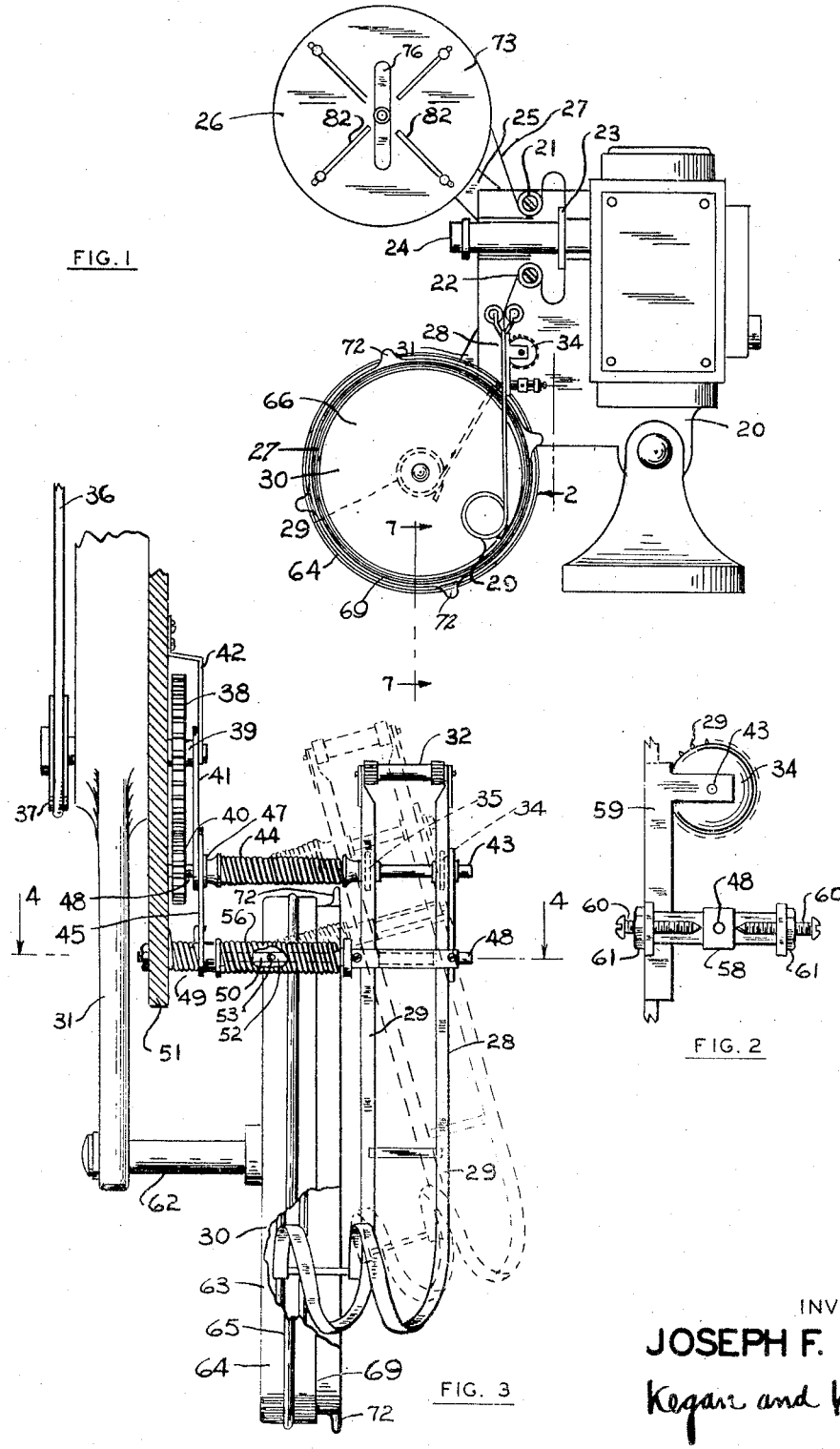
INVENTOR
JOSEPH F. PROCH
Kegan and Kegan
ATTY'S Jan. 24, 1950   J. F. PROCH   2,495,344
FILM WINDING APPARATUS
Filed July 6, 1948   3 Sheets-Sheet 2

INVENTOR
JOSEPH F. PROCH
Kegan and Kegan
ATTY'S

Jan. 24, 1950   J. F. PROCH   2,495,344
FILM WINDING APPARATUS

Filed July 6, 1948   3 Sheets-Sheet 3

INVENTOR
JOSEPH F. PROCH
Kegan and Kegan
ATTYS.

Patented Jan. 24, 1950

2,495,344

UNITED STATES PATENT OFFICE 2,495,344

FILM WINDING APPARATUS

Joseph F. Proch, Chicago, Ill.

Application July 6, 1948, Serial No. 37,197

11 Claims. (Cl. 88—18.7)

This invention relates to motion picture projector apparatus. More particularly, my invention relates to improvements in film winding apparatus in which the film, after being projected, winds into a take-up drum with the leading end of the film outermost. Thus the starting end of the film is on the outside of the spool of film after the film has been wound up.

An object of my invention is to provide film winding apparatus in which the movement of the film feeding into the take-up drum is used to turn said drum.

Another object of the present invention is to provide film feeding mechanism which automatically compensates for the varying thickness of the film as it is being wound into the take-up drum.

Another object of the present invention is to provide film winding apparatus in which the film is easily removed from the take-up drum and transferred to a storage reel.

Another object is to provide film winding mechanism capable of handling films of different lengths.

Another object of my invention is to provide film winding apparatus which is dependable in its operation, which safeguards the film, and which greatly reduces the time normally devoted to rewinding the film.

To this end, the present invention utilizes the force imparted to the film by means of novel feed mechanism, to turn the take-up drum and to cause the film feed mechanism to move inwardly, with respect to the axis of the drum, to compensate for variations in the thickness of the spooled film. By this expedient the take-up drum may be freed of all drive mechanism, and can therefore be of simple and efficient construction. Similarly, by means of novel hinging mechanism, the film feed mechanism may be moved away from the take-up drum to expedite transfer of the film onto the storage reel. Moreover, the storage reel incorporates novel adjustment features whereby films of widely different lengths may be handled.

In order that my invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a front elevational view of a motion picture projector incorporating my novel film winding apparatus;

Figure 2 is a side elevational view of a portion of my invention showing details of the film feed mechanism;

Figure 3 is a side elevational view of a detail of the film feed mechanism;

Like reference numerals designate like parts in the drawings and in the description which follows.

Figure 4:
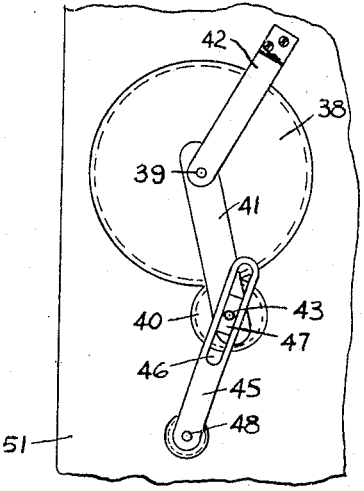
Figure 4 is a detail of the gear system of the film feed mechanism of Figure 2.
Figure 6:
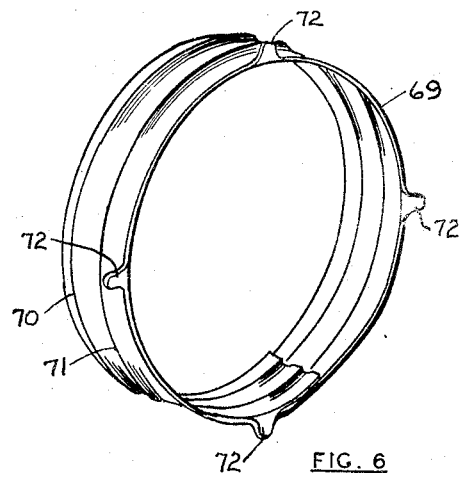
Figure 6 is a perspective view of the liner which cooperates with the take-up drum.

Before proceeding with a detailed description of the construction and operation of the several parts comprising the embodiment shown in the drawings, and to better indicate the broad concept of my invention, I have described, in brief outline below, the broad organization of the parts comprising said embodiment.

Thus, in Figure 1 is shown a motion picture projector 20 which includes conventional drive sprockets 21 and 22, a film gate 23, and projector lens 24, and an arm 25 to support the storage reel 26, from which film 27 is spooled and threaded in the customary manner through the film gate 23.

After being threaded through the film gate 23, the film 27 is threaded through the film feed mechanism 28. As the film feeds from the guide members 29 of the feed mechanism 28, it is spooled into the take-up drum or reel 30, which is rotatably supported on the arm 31. As shown in dotted lines in Figure 1, the film feed mechanism 28 deflects toward the axis of the take-up spool 30 as the thickness of the film 27 within the take-up drum 30 increases.

*Film feed mechanism*

The film feed mechanism 28 includes a pair of upper rollers 32, 32 and a pair of film guides or channels 29, 29, the bottom portions of which are formed into a helix to facilitate feeding the film 27 into the take-up drum 30. A pair of sprocket wheels 34 and 35 engage the edge perforations or sprocket holes formed in the edge of the film 27. Power to drive the sprocket wheels 34 and 35 is supplied by the belt 36 which drives the pulley 27. A spur or sun gear 38 is driven by the pulley 37 through the shaft 39 and is pivotally supported by the frame member 42.

Referring now to Figure 4, the sun gear meshes with and drives the spur or planetary gear 40, which is supported by the arm 41. The planetary gear 40 in turn drives the shaft 43 which is linked to the flexible spring shaft 44. Also coupled to the shaft 43 is the pivot block 47. The block 47 translates along the slot 46 in the arm 45, thereby permitting rotation of the gear 40 about the gear 38. The arm 45 pivots about the shaft 48 as a center and is spring-loaded by the torsional spring 49 (best shown in Figures 2 and 5), one end of which is anchored to the frame member 51. As the arm 45 turns, therefore, a restoring force is exerted by the spring 49.

Figure 5:
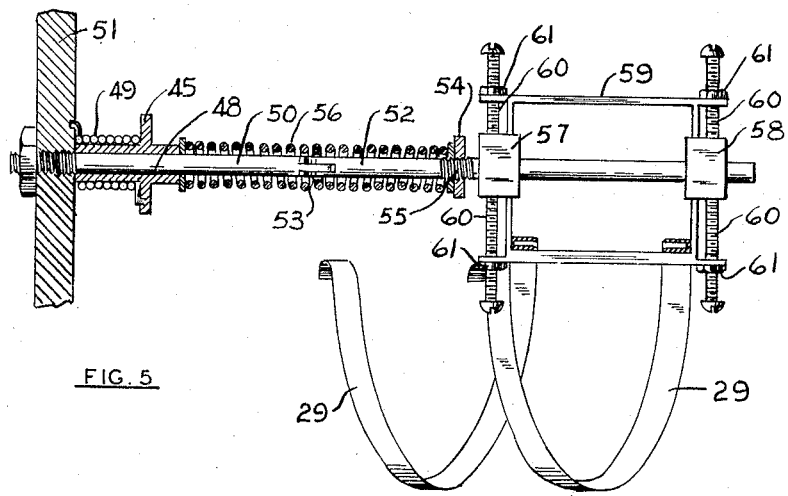
Figure 5 is a plan view taken in section on line 4—4 of Figure 3.

Referring now to Figure 5, the shaft 48 is shown as including a portion 50 one end of which is secured to the frame member 51. The other end of the portion 50 is hinged to the portion 52 by the pivot pin 53. Consequently, the shaft portion 52 can pivot only in a vertical plane. A retaining nut 54 is threaded onto the threaded section 55 of the portion 52, and retains a coil spring 56 which surrounds the shaft 48. The spring 56 acts to resist any upward, vertical deflection of the shaft portion 52, so that the two portions of the shaft 48 always tend to remain in a horizontal position. The shaft portion 52 also carries two pivot blocks 57 and 58, which act as supports for the frame 59 to which the guide members 29, 29 are secured. By means of the adjustment screws 60 and the cooperating retainer nuts 61, the position of the guide members 29, 29 may be adjusted relative to the shaft 58.

*Take-up drum*

Figure 12:
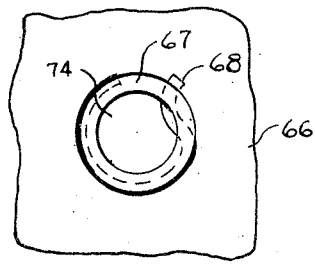
Figure 12 is a fragmentary view, in front elevation, showing details of the center opening of the retainer plate.

Referring now to Figures 1 and 2, the take-up drum 30 is rotatably mounted on the shaft 62 supported by the arm 31. The take-up drum 30 comprises a circular backing plate 63 and a flange 64, the flange 64 containing an annular groove 65. A circular retaining plate 66 is normally positioned within the take-up spool 30 next to the backing plate 63, for the reasons explained below in conjunction with the operation of my invention. As best shown in Figure 12, the retaining plate 66 includes a center bushing 67 and a spring detent 68.

Figure 7:
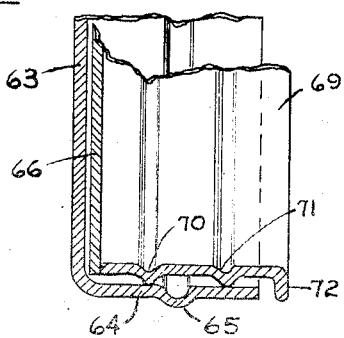
Figure 7 is a fragmentary sectional view taken on the line 7—7 of Figure 1, showing the liner of Figure 6 in position.
Figure 8:
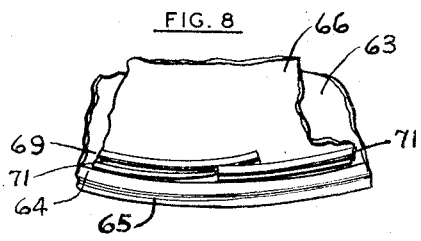
Figure 8 is a fragmentary view, in front elevation, of the take-up drum with the liner in position.

Referring now to Figure 7, the liner 69 is split to permit expansion thereof, and is further characterized by a pair of outwardly extending annular grooves 70 and 71. When the liner 69 is inserted within the take-up drum 30, the grooves 70 and 71 ride on the flange 64 and compress the liner 69 an amount sufficient to retain the plate 66 securely in place. By moving the liner 69 away from the backing plate 63 a slight amount, however, the groove 70 engages the groove 65, thereby permitting the liner 69 to expand sufficiently to permit the withdrawal of the plate 66. To assist in moving the liner 69 outwardly the proper distance, a plurality of studs 72 are provided about the circumference of the liner 69. Figure 8 shows the manner in which the ends of the liner 69 overlap. In operating the projector 20, this overlap provides a stop or catch for the end of the film 27.

*Storage reel*

Figure 9:
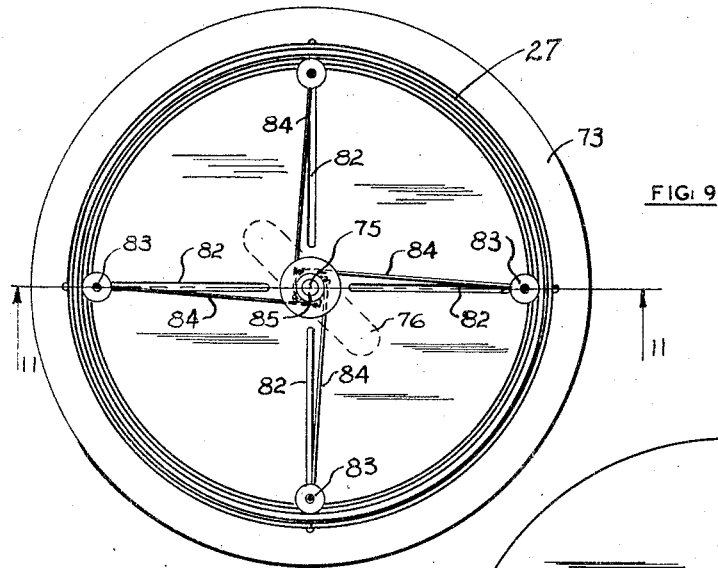
Figure 9 is a front elevational view of the storage reel showing the positions of the several parts thereof when film is wound upon the reel.
Figure 10:
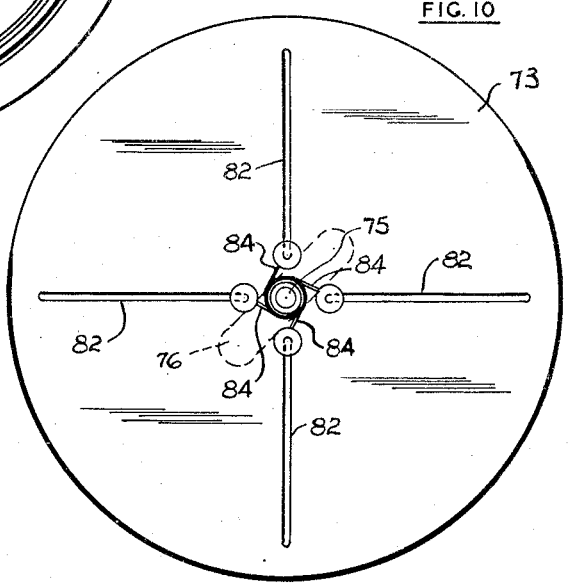
Figure 10 is a front elevational view of the embodiment of Figure 9, in which the film supporting rollers are shown wound into the center of the reel.
Figure 11:
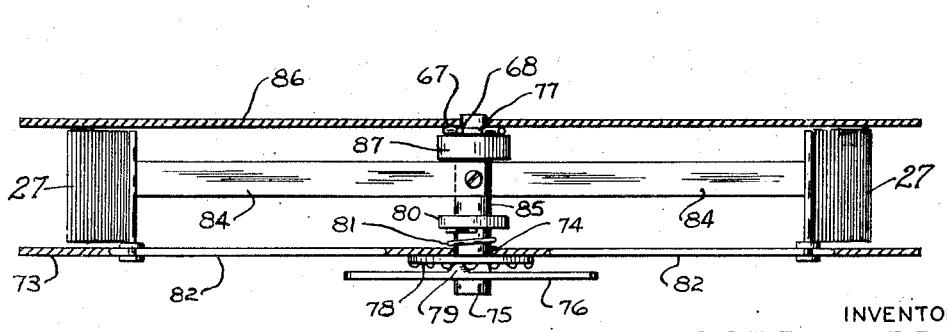
Figure 11 is a plan elevational view taken in section on line 11—11 of Figure 9 showing a retainer plate in position to retain the film upon the film supporting rollers.

Referring now to Figures 9–11, the storage reel 26 includes a circular plate 73 having a central opening 74. A shaft 75 is journaled within this opening 74 and is provided with a handle 76 at the one end thereof. A ratchet plate 78 is secured to the plate 73 concentric with the opening 74, the teeth of the plate 78 normally engaged with a detent 79 carried by the handle 76. The shaft 75 carries a collar 80 which restrains a helical compression spring 81, and is further characterized by a groove 77 in one end thereof.

A plurality of slots 82 are formed in the plate 73, the drawings showing these slots to be arranged in a radial pattern although other patterns having a radial component may obviously be used. Film support rollers 83 ride within and are guided by the slot 82. Each of the film support rollers 83 is secured to one end of a flat spring 84, the other end of each spring being secured to the hub portion 85 of the shaft 75. By turning the handle 76, and thereby turning the shaft 75, the springs 84 may be wound up about the hub portion 85 in coil-like fashion. The appearance of the reel 26 when the rollers 83 are thus wound into the center of the plate 73, is shown in Figure 10. Conversely, the rollers 83 may be released from the position of Figure 10 and moved radially outward under the action of the springs 84 by causing the plate 73 to move relative to the shaft 75 against the action of the spring 81, thereby causing the detent 79 to disengage with the ratchet plate 78.

When the reel 26 is used for the storage of film, the film 27 is supported in place by the support rollers 83. The retaining plate 86, which may be identical with the retaining plate 66, is secured to the shaft 75 by the coaction of the spring detent 68 (Figure 12) and the groove 77. A washer 87 is positioned between the bushing 67 and the hub portion 85 of the shaft 75.

*Operation*

After the storage reel 26 has been placed upon the projector 20 in the manner shown in Figure 1, the film 27 is threaded through the drive sprockets 21 and 22 and the film gate 23 in the conventional manner. Following this, the film 27 is threaded between the rollers 32 and 33, into the guide members 29, 29.

To prepare the take-up drum 30 for operation, the liner 69 is pulled away from the backing plate 63 until the groove 70 aligns itself with the groove 65 in the flange 64 of the spool 30. After the liner has been placed in this position, there is sufficient clearance for the insertion of the retaining plate 66 (or 86) after which the plate 66 is secured in place by moving the liner 69 into the position shown in Figure 7. While in this position, the two ends of the liner 69 overlap in the manner best shown in Figure 8. The overlap of these end portions of the liner 69 provide a stop for the film 27 as it feeds from the film guides 29, 29. Consequently, as the film 27 continues to feed into the take-up drum 30 from the film guides 29, 29, the result is to turn the drum 30 and thereby coil the film 27 within said drum 30 with the leading end outermost.

As indicated above, power to drive the film 27 is obtained through planetary gear mechanism and a flexible coupling used in conjunction therewith. More explicitly, as the pulley 37 turns, the sun gear 38 drives the planetary gear 40, thereby rotating the sprocket wheels 34 and 35 through the flexible spring shaft 44. At the same time, the planetary gear 40 may rotate through a limited arc about the shaft 48 against the resistance of the torsional spring 49.

When the film feed mechanism 28 is in the position shown in Figure 1, and film commences to feed from the guide members 29, 29, the reactive force exerted by the film 27 is almost directly vertical. Hence, the rotating or tangential force component acting on the members 29, 29 is relatively small and the spring 49 is able to resist turning. As the thickness of the film coiled into the drum 30 increases, however, the reactive force exerted by the film 27 on the members 29, 29 shifts from the vertical, and the tangential force component increases. This causes the guide members 29, 29 to turn against the resistance of the spring 49 until a new equilibrium condition is reached. In this way, the guide members 29, 29 automatically displace to compensate for the changing thickness of the coiled film as the drum 30 rotates. At the same time, the guide members 29, 29 are always at a position which gives a favorable utilization of the power imparted to the film 27 by the sprocket wheels 34 and 35, for the purpose of turning the drum 30.

To obtain optimum utilization of this driving force, it may be necessary to adjust the reference or null position of the film feed mechanism 28. As best shown by Figures 3 and 5, this adjustment is obtained by means of the adjustment screws 60, the net effect being to reposition the frame 29 with respect to the pivot blocks 57 and 58. This acts to turn the guide members 29, 29 about the shaft 43, the direction of turning depending upon the shifting of the shaft 48 relative to the shaft 43. Thus, for example, to swing the helix portion of the guide members 29, 29 counter-clockwise, and thereby obtain a somewhat greater driving force acting on the drum 30, the left hand screw 60 of Figure 3 should be loosened, and the right hand screw 60 tightened. After the desired adjustment has been effected, the retaining nuts 61 are then tightened. To turn the helix portion in a clockwise direction, the right hand screw 60 is loosened and the left hand screw 60 is tightened.

After the film on the storage reel 26 has been wound into the take-up drum 30, the plate 86 is removed from the storage reel 26, following which the handle 76 is turned so as to wind the rollers 83 into the position shown in Figure 10. Next, the film feed mechanism is swung out and away from the drum 30 by means of the hinge construction of the shaft 48. This enables the operator to insert the plate 73 within the drum 30 so that the shaft 75 is aligned with the opening 74 within the bushing 67 of the plate 66 (or 86). Following this, the plate 66 is secured to the shaft 75 by snapping the spring detent 68 into the groove 77. By applying pressure to the central portion of the plate 73, so that it flexes inwardly a slight amount, the ratchet plate 78 is disengaged from the detent 79, thereby permitting the springs 82 to move the rollers 83 along the slots 82 until the rollers 83 engage the innermost layer of the film 27. Upon releasing the pressure upon the plate 73, the spring 81 acts to reengage the ratchet plate 78 with the detent 79 so that this new position is retained securely. It will thus be apparent that by the use of the few simple steps described above that the film is once again stored upon the storage reel 26.

To remove the storage reel 26 from the drum 30, it is only necessary to pull the liner 69 out a slight amount so that the groove 70 engages within the groove 65, thereby permitting the liner 69 to expand an amount sufficient to permit the withdrawal of the plate 66. Since the first shown portion of the film 27 is on the outside of the film 27 stored on the storage reel 26, it is apparent that the film is now ready for another showing and that no rewind operation is required. It will thus be apparent that the objects set forth above have been fulfilled by the film winding apparatus described and shown herein.

While I have shown and described certain embodiments of my invention, it is to be understood that these embodiments have been given by way of example only and that various changes and rearrangements of the details shown herein may be made without departing from the spirit of the invention, the scope of which is defined in the appended claims.

I claim:

1. A motion picture projector comprising: a first shaft, a storage reel on said shaft, a film gate, sprocket drive means for drawing film through said film gate, a second shaft, a take-up drum having a deep flange thereon, said drum freely rotatable on said second shaft, a split liner concentric with said flange and extending outwardly therefrom, a film guide guiding said film from said drive means into said drum, means for securing the leading end of said film adjacent said liner of said drum, mechanism for feeding said film through said film guide to impinge on said liner and turn said drum, whereby said film is rewound in said drum with the leading end outermost, means for displacing said film guide to accommodate the increasing number of layers of film as said drum rotates, and other means for spring-loading said film guide to oppose displacement thereof.

2. A device as defined in claim 1, wherein said storage reel comprises: a first plate having a first center opening and a plurality of radially disposed slots therein; a film support for each of said slots and movable therealong; a shaft in said center opening, said shaft having a handle on one end thereof and a groove in the other end thereof; ratchet mechanism between said handle and said plate whereby said shaft may be locked against turning in one direction; a flat, coilable spring between each of said film supports and said shaft, respectively, whereby turning said handle in one direction spring-winds said film supports toward said central opening, and whereby said ratchet mechanism prevents outward movement of said supports under the action of said springs; a collar on said shaft; a helical spring between said shaft and said thin plate, whereby flexing the first plate against said spring releases said ratchet mechanism to permit said supports to move outward radially, and whereby release of said first plate re-engages said ratchet mechanism; a second plate having a second center opening therein; and a snap spring extending into said second opening and adapted to engage said groove in said shaft, whereby said second plate is removably secured to said shaft.

3. A projector as defined in claim 1, wherein said mechanism for feeding said film comprises a pair of parallel-spaced channels adapted to receive the edges, respectively, of said film, said channels terminating in a helix which normally extends within said liner, and at least one sprocket wheel adapted to engage perforations in an edge of said film to drive said film along said channels.

4. In a motion picture projector including a first shaft, a storage reel on said first shaft, a film gate and means for drawing film therethrough, other means for rewinding said film with the leading end outermost, said other means comprising: a first shaft, a plate pivoted on said first shaft, flange means on said plate, a second shaft parallel with said first shaft, a film guide member pivotably secured to the outer free end of said second shaft, a pair of sprocket wheels carried by said guide member to engage said film, a first driven gear, a planetary gear movable about said first gear, a link pivoted on said second shaft and having a slot therein, a member slidable in said slot, a third shaft turned by said planetary gear and journaled by said block, a torsion spring between said link and said second shaft, and a flexible spring coupling between said third shaft and said sprocket wheels.

5. In a motion picture projector including a film gate and means for drawing film therethrough, other means for rewinding said film with the leading end outermost, said other means comprising: a first shaft, a plate pivoted on said first shaft, flange means on said plate, a second shaft, a film guide member pivotably secured to the outer end of said second shaft, hinge means in said second shaft whereby said guide member may be moved away from said plate, a pair of sprocket wheels carried by said guide member to engage said film, a first driven gear, a planetary gear movable about said first gear, a flexible drive shaft between said planetary gear and said sprocket wheels, whereby said guide member may rotate about said second shaft as said film adjacent said flange means increases in thickness, and spring means connected to said planetary gear to resist rotation of said guide member.

6. A motion picture projector comprising: a first shaft; a storage reel detachably mounted on said first shaft and including a first plate having a center opening therein, a plurality of guide means radially disposed in said first plate, a plurality of fingers movable, respectively, along said guide means, a center support member extending through said opening in said first plate, means for turning said member, ratchet mechanism interconnecting said plate and said turning means whereby said turning member may be locked against turning in one direction, a plurality of coilable springs each between a different one of said fingers and said support member, whereby turning said member in one direction spring-winds said fingers toward said member, means for disengaging said ratchet mechanism, whereby said fingers are spring driven away from said member, a second plate having a center opening therein shaped to receive said member, and means securing said second plate to said second member; a film gate; means for passing film through said film gate; and means for rewinding said film with the leading end outermost, said rewinding means including a second shaft and a flanged plate freely rotatable thereon, means carried by the flange portion of said flanged plate for securing the end of said film, mechanism feeding said film onto said flange portion, whereby the force exerted on said flange portion by said film turns said flanged plate to wind up the film, and means for displacing said mechanism to accommodate the increasing number of layers of film as said flanged plate rotates.

7. A motion picture projector comprising: a first shaft; a storage reel mounted on said shaft; a film gate; means for passing film through said film gate; and means for rewinding said film with the leading end outermost, said rewinding means including a second shaft and a plate freely rotatable thereon, a flange on the periphery of said plate, said flange having an outwardly extending annular groove therein, and a flexible split liner adapted to fit within said flange with the ends thereof overlapping, said liner having an outwardly extending annular groove therein, which rides upon said flange when said liner is in normal operating position, and which engages said groove in said flange when said liner is pulled away from said plate, mechanism feeding said film on to said split liner, the overlapping ends of said liner providing a stop for the end of said film, whereby the force exerted on said liner by said film turns said plate to wind up said film, and means for displacing said mechanism to accommodate the increasing number of layers of film as said plate rotates.

8. A motion picture projector comprising: a first shaft; a storage reel mounted on said shaft; a film gate; means for passing film through said film gate; and means for rewinding said film with the leading end outermost, said rewinding means including a second shaft and a plate rotatably mounted thereon, said plate including flange means thereon, means carried by said flange means for securing the end of said film, a support member, a pair of parallel-spaced channels pivotally mounted on said support member to receive said film, said channels terminating in a helix portion normally extending between said flange means, rotary film engaging members interconnected with said channels to feed said film along said channels against said flange means whereby the force exerted on said flange means by said film turns said plate to wind up said film, a rotatable, driven member, flexible drive means between said driven member and said film engaging members, and spring means resisting rotation of said channels about said support member, whereby said channels may displace to accommodate the increasing number of layers of film as said plate rotates.

9. A storage reel for motion picture projectors, comprising a first plate having a first center opening therein, a plurality of guide means associated with said first plate and a plurality of film supporting elements movable therealong, respectively, said guide means conformed so that said elements move in a radial direction, a rotatable member extending through said first opening, mechanism connecting said plate and said member for locking said member against turning in one direction, a coilable, resilient member between each of said elements and said turnable member, whereby turning said rotatable member in one direction tensions said resilient member and draws said elements toward said rotatable member, means for disengaging said mechanism, whereby said elements move away from said rotatable member by the energy forces stored in said resilient members, a second plate having a second center opening therein adapted to receive said rotatable member, and means securing said second plate to said rotatable member.

10. In motion picture projector apparatus, a film take-up drum comprising, a circular plate rotatable on a shaft, a flange extending from said plate and having a first groove therein, and a split liner positionable within said flange, said liner having a second groove therein which is aligned with said first groove when said liner is partially disengaged from said flange, said second groove riding up upon said flange when said liner is fully engaged with said flange.

11. In a motion picture projector, apparatus for rewinding said film with the leading end outermost, including a shaft, a plate rotatably supported by said shaft and including flange means thereon, guide means for receiving said film terminating in a helix portion normally extending between said flange means, a member about which said guide means turns, means to feed said film through said guide means against said flange means, whereby the force exerted by said film moving against said flange means turns said plate to wind up said film, a flexible drive shaft coupled to said feed means, and spring means connected to said guide means for resisting rotational movement thereof about said member.

JOSEPH F. PROCH.

REFERENCES CITED

The following references are of record in the file of this patent:

UNITED STATES PATENTS

| Number | Name | Date |
|---|---|---|
| 1,551,037 | Lube | Aug. 25, 1925 |
| 2,039,949 | Bombrun | May 5, 1936 |